United States Patent [19]
Reymond

[11] Patent Number: 4,550,984
[45] Date of Patent: Nov. 5, 1985

[54] HEAD-MOUNTED OR HELMET-MOUNTED SIGHTING DEVICE

[75] Inventor: Jean C. Reymond, Paris, France

[73] Assignee: Thomson CSF, Paris, France

[21] Appl. No.: 468,599

[22] Filed: Feb. 22, 1983

[30] Foreign Application Priority Data

Feb. 26, 1982 [FR] France .................... 82 03261

[51] Int. Cl.[4] .................. G02F 1/21; G01C 9/06; F21Q 3/00
[52] U.S. Cl. ........................... 350/404; 33/262; 116/202
[58] Field of Search .................. 350/404; 351/158; 33/262, 267; 116/202

[56] References Cited

U.S. PATENT DOCUMENTS

| | | | |
|---|---|---|---|
| 2,352,644 | 7/1944 | Linderman, Jr. et al. | 351/158 |
| 2,420,252 | 5/1947 | Land | 350/404 |
| 3,060,308 | 10/1962 | Fortuna | 351/158 |
| 3,262,210 | 7/1966 | Shapiro et al. | 33/262 |
| 3,498,293 | 3/1970 | Oppenheimer | 351/158 |
| 4,193,689 | 3/1980 | Reymond et al. | 356/152 |
| 4,396,885 | 8/1983 | Constant | 324/208 |

FOREIGN PATENT DOCUMENTS 708299 4/1965 Canada .................. 340/870.19

*Primary Examiner*—William H. Punter
*Attorney, Agent, or Firm*—Cushman, Darby & Cushman

[57] ABSTRACT

An image forming a sighting reticle can be displayed at infinity in the landscape under observation without any need for a collimating optical system. To this end, a birefringent crystal plate having parallel faces is placed between two crystal plates employed as polarizing filters and consisting respectively of a polarizer and an analyzer in order to produce the reticle in the form of interference fringes centered on the line of sight. The very lightweight sighting device can be integrated in one eye-glass of a spectacle frame or in a helmet visor. Complementary diodes can be incorporated in the device for providing information relating to directional prepositioning and the like.

7 Claims, 5 Drawing Figures

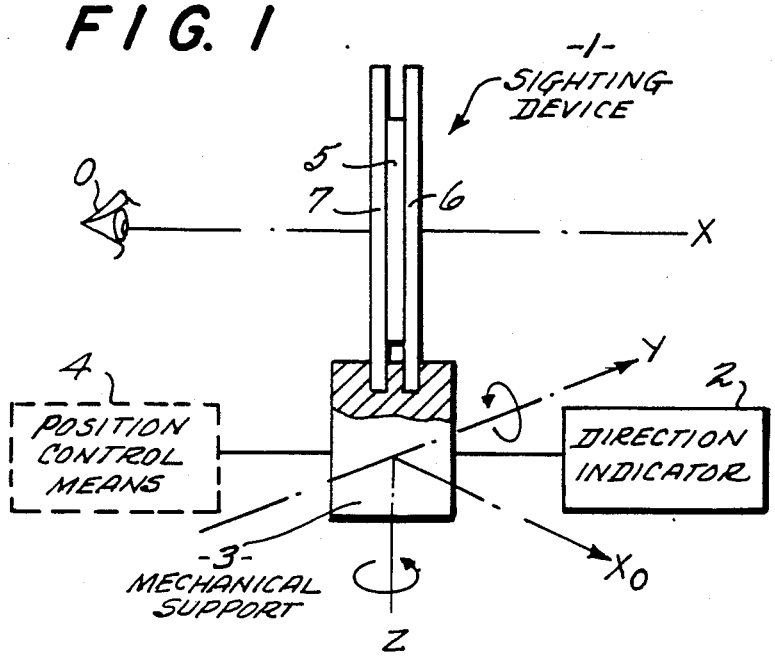
FIG. 1
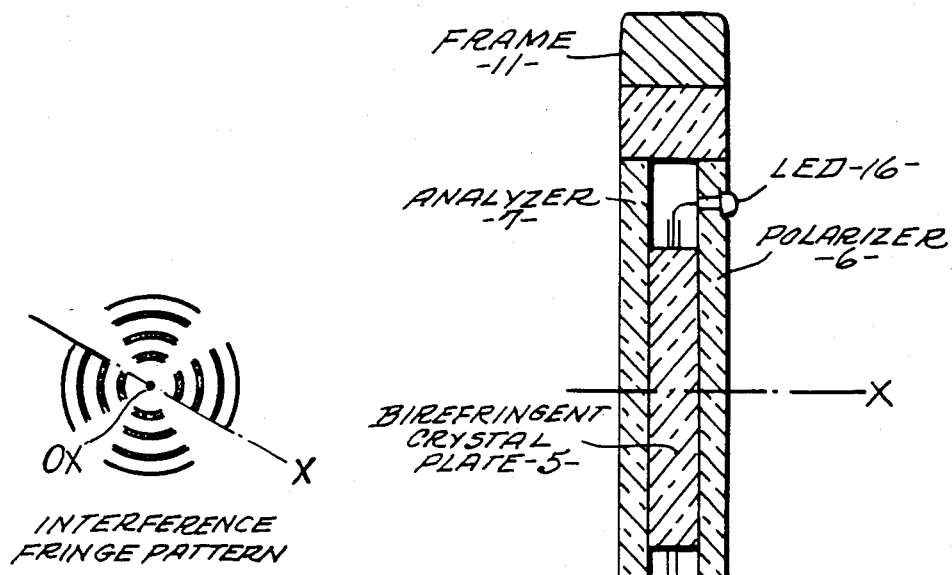
FIG. 2
FIG. 4

HEAD-MOUNTED OR HELMET-MOUNTED SIGHTING DEVICE

This invention relates to a sighting apparatus or in other words to an optical device which serves to take aim and which is usually employed for target designation for either firing or bombing.

Fire control, in particular on board a fighter aircraft engaged in air-to-air combat or air-to-surface combat, makes it increasingly necessary for the operator (firer or pilot) to be able to designate the target very rapidly.

In this field of application, targets are usually designated by means of a high-head collimator fixed on the aircraft within the cockpit or mounted on the pilot's helmet. These optical collimators permit observation at infinity of the image of a real luminous object superimposed on the external scene. In the application to aiming and target-designating, the field employed can be reduced by reason of the fact that the object to be projected can consist of a single reticle. These systems, known as sighting devices in accordance with their intended function, can be constructed especially by making use of an optical element constituted by a curved surface of the helmet visor which has been made semi-transparent. It must in fact be considered that, in the case of equipment units of this type and especially those mounted on helmets, small overall size and weight as well as great ease of use and enhanced performances are imperative criteria. This is more important in the case of a helmet sight visor since the collimator must be completed by a direction-indicating system in order to determine at each instant the direction of the optical sighting axis with respect to a reference direction. These indicating systems can be of the optical or magnetic type and comprise a section mounted on the helmet and a section attached to the aircraft. The pilot has to carry the weight of these different equipment units multiplied by the load factor and it is readily apparent that any reduction in weight is considered as a welcome feature.

The aim of the invention is to provide a sighting device of very light weight and of very small bulk which can in particular be mounted on a helmet visor or designed in the form of a simple spectacle frame. The sighting device is not specifically equipped with an optical collimator but a sighting reticle viewed at infinity is nevertheless provided and is permanently at the operator's disposal. The sighting device is static and can also be equipped with lamps for indicating, for example, directional information, or various orders, or the state of the weapons system.

In accordance with the invention, provision is made for a sighting device comprising means for simultaneous visual display of the landscape and of an image which is projected to infinity on an optical line of sight. If necessary, said visual display means are combined with means for indicating the direction of said optical line of sight with respect to a reference direction. The visual display means essentially make use of a device for generating interferences by means of an assembly of crystal plates constituted by a birefringent crystal plate having parallel faces and placed between two plates having the function of optical polarizing filters consisting respectively of a polarizer and an analyzer. It is thus intended to produce the aforesaid image in the form of interference fringes localized at infinity from the incident light emitted by the landscape under observation. The optical line of sight corresponds to the crystal axis of the birefringent plate which is cut at right angles to this direction.

Other features of the invention will be more apparent upon consideration of the following description and accompanying drawings, wherein:

FIG. 1 is a schematic diagram of a sighting device in accordance with the present invention;

FIG. 2 illustrates one example of a sighting reticle formed by interference fringes;

FIG. 4 is a transverse sectional view of the sighting device in the embodiment of FIG. 3;

Figure 3:
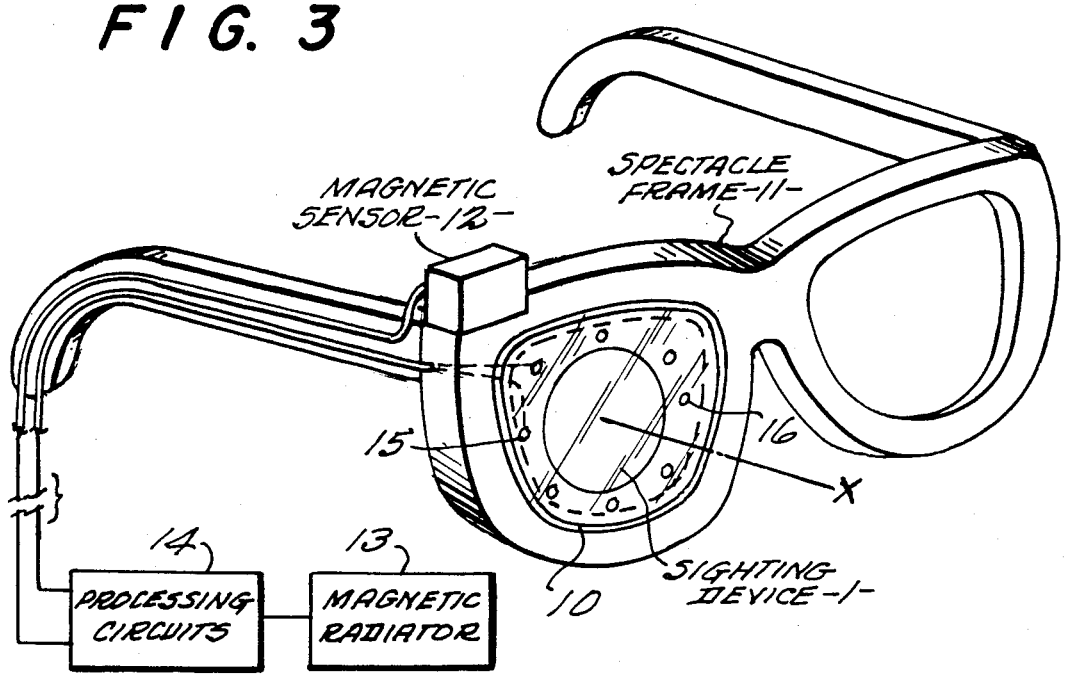
FIG. 3 illustrates one embodiment of a sighting device in accordance with the invention and entailing the use of a spectacle frame.

Referring to FIG. 1, the sighting device comprises visualization means 1 for simultaneous visual display of the landscape and of an image projected to infinity on an optical line of sight X. The visual display means 1 are usually combined with direction-indicating means 2 for determining at any moment the direction of said line of sight with respect to a reference direction such as, for example, the direction Xo shown in the figure.

For the sake of better understanding, the two devices 1 and 2 are shown as coupled by means of a mechanical supporting member 3 on which the visual display means 1 is fixed. Furthermore, the displacement of the operator's line of sight X (the operator's viewing eye being shown at O in the figure) is represented by a position-control means 4 and two orthogonal axes of rotation Y and Z. The unit 4 is shown in dashed outline since this can be a control movement performed by the operator himself either by hand or head movements according to the design of the sighting device. In consequence, said unit does not necessarily represent a device or a circuit. It will likewise be noted that, depending on the version which is adopted, coupling of the direction-indicating means 2 to the support 3 can be effected in a number of different ways.

In accordance with the invention, the visual display means 1 is designed in a static form and constituted by a birefringent crystal plate 5 having parallel faces. Said plate is placed between two optical polarizing filters 6 and 7 which perform the respective function of polarizer and analyzer and also have a plate configuration. This arrangement of a crystal plate with Nicol prisms is known per se. Relevant information may be obtained from the book entitled "Optique" by G. Bruhat and published by Masson and Company. Reference should be made in particular to the chapter entitled "Interferences produites par les lames cristallines" (Interferences produced by crystal plates) and to the chapter entitled "Rayons lumineux dans un milieu anisotrope" (Light rays in an anisotropic medium), Section 2: "Réfraction des rayons lumineux" (Refraction of light rays).

The presence of the polarizing filters 6 and 7, designated hereinafter as polarizers for the sake of enhanced simplicity, permits observation of interference fringes produced by the light in the crystal plate 5. When this plate is illuminated by a source of large area (which is the case under consideration since the light is produced by the external landscape under observation), the interference fringes are localized at infinity. That portion of the incident light which emanates from the external scene and the polarization of which corresponds to that of the optical system passes through this latter, thus reaching the eye at O and enabling the observer to view this scene. The remaining portion of incident light interfere and produces fringes which are visualized at infinity.

The state of polarization of the optical system depends on the relative position and character of the polarizers 6 and 7. The term "character" is understood to mean the type of polarization, whether linear or circular, this latter being obtained by addition of a quarter-wave plate. By "relative position" is meant a movement of rotation of one polarizer with respect to the other about the axis X. It is thus possible to obtain different interference patterns, one example of which is shown diagrammatically in FIG. 2. The fringes are formed by rings whose radii vary in accordance with a law which is similar to that of the radii of Newton's rings, the radii being inversely proportional to the square root of the thickness of the plate 5. FIG. 2 corresponds to interference fringes which can be produced in white light with linear-polarization polarizers.

Between crossed polarizers, the pattern obtained is that of concentric rings having a black center and is intersected by a black cross. Between parallel polarizers, the pattern is that of rings having a white center and intersected by a white cross. This version corresponds to FIG. 2 and is preferable for the head-mounted sighting device which is contemplated in view of the need for simultaneous viewing of the landscape through this device. A representation of circular fringes without a cross can be obtained by means of polarizers of the circular polarization type.

In accordance with the invention, these interference fringes are employed as a sighting or firing reticle by reason of the fact that, on the one hand, they are localized at infinity as in the case of a collimated image and that, on the other hand, the rings are concentric with the optic axis of the system (indicated by its trace OX in FIG. 2) which constitutes the line of sight X. This line also corresponds to the crystal axis of the plate 5 which is cut accordingly. In the case of a plate 5 having flat faces as shown, the plane of the faces is orthogonal to the direction X. This does not exclude other forms of construction with parallel faces but not necessarily flat faces, especially in order to facilitate integration with a helmet visor. The crystal plate 5 is chosen from material having high birefringence, preference being given to Iceland spar (transparent calcite).

The static optical sighting device thus formed permits simultaneous observation of a landscape and of an interferential reticle, this latter being formed without the aid of a particular light source positioned at the focus of an optical collimating device. The contrast of the reticle is constant. The sighting direction X defined by the reticle is dependent only on the crystallographic direction of the crystal plate 5. By virtue of the configuration of the reticle having a base of concentric rings, the line of sight X of the reticle can readily be brought into visual coincidence with a precise point of the landscape, thereby constituting the sighting operation proper.

FIGS. 3 and 4 relate to a preferential embodiment in the form of a spectacle frame, although it should be understood that the sighting unit can be mounted on any mechanical support which is rigidly fixed to the general equipment (either a stationary or a movable installation as applicable, for example, to a land, sea or air vehicle) or which is dependent on said equipment (in the case of a helmet-mounted sighting device).

The sighting device 1 is mounted so as to be centered in one of the eye-glasses of the spectacle frame, for example in the right-hand eye-glass 10. FIG. 4 is a transverse sectional view of the device through the axis X. It should be noted that, if the sighting device 1 is of sufficient size, it can occupy the entire eye-glass surface and thus be mounted directly on the spectacle frame 11.

In the example shown in the drawings, the means for indicating the direction X is of the magnetic type in which provision is made for a sensor 12 which is rigidly fixed to the spectacle frame, a radiator 13 rigidly fixed to the aircraft (or to the installation considered) and processing circuits 14 with an auxiliary computer. Such a measuring device is described U.S. Pat. No. 4,396,885. The sensor and the radiator are each equipped with a three-coil assembly which defines the axes of a cartesian trihedron. The sensor can be a small-size and compact unit designed, for example, in the form of a cube of edge 10 mm approximately.

Furthermore, before or during the sighting operation proper, the operator may require various items of information. In the case of a fighter aircraft pilot, it may prove useful to provide him with preliminary direction information in order to carry out a rapid target search in the landscape. This information is transmitted by a change of state of indicator lamps (turned on or off, or intermittent "winking") and possibly a change of color of indicator lamps disposed around the sighting device proper, that is to say outside the field of view of the interference fringes. In the embodiment of FIGS. 3 and 4, said indicator lamps are constituted by electroluminescent diodes such as the diodes designated by the references 15 and 16. These diodes can be eight in number and arranged in a circle at angular intervals of 45° in order to provide a coarse indication of direction.

The information provided by turn-on of the diodes is provided by a computer circuit or auxiliary computer 14. This diode turn-on circuit 14 can in turn be controlled directly by the operator who desires to designate a direction, or by means of an elaborate detection system such as an on-board radar, for example, for automatic translation of a target direction into an order for turn-on of a corresponding diode, with the result that the pilot orients the head towards this direction for rapid target acquisition and homing.

In order to ensure higher precision in the movement to be performed, the diodes can be controlled in such a manner as to ensure that the diode located nearest the direction to be sighted is caused to wink at a frequency which is an increasing function of the relative angular deviation which remains to be corrected. When the pilot's line of sight is far from the target direction to be followed, the frequency will be of a high order such as ten Hertz, for example. As the head comes closer to the target direction, so the frequency will decrease and finally become very low, namely of the order of 1 Hz, for example, in the case of a deviation of 1 to 2 mrd. The diodes are turned-off as soon as target acquisition is achieved.

The diodes are supplied by means of a set of wires 17 which are passed, for example, along a side-piece 18 of the spectacle frame. After passing through the frame 11 and the glass eye-piece 10, said set of wires is finally connected to the different diodes within an annular space formed between the polarizer plates 6 and 7, the plate 5 being of smaller diameter than the polarizer plates. By employing very fine wires, these latter are not detected by the eye and do not hinder the observer.

The set of wires 19 for connecting the coils of the sensor 12 can be placed next to the set of wires 17 for supplying the diodes. The group of two sets remains very flexible and does not cause the slightest hindrance to the movements of the operator's head.

There can also be provided a device which serves to adjust both for height and width (spacing between pupils) in order to ensure that the sighting device is well centered on the operator's line of sight and that the spectacle-mounted device is thus adapted to the wearer's visual conformation.

Figure 5:
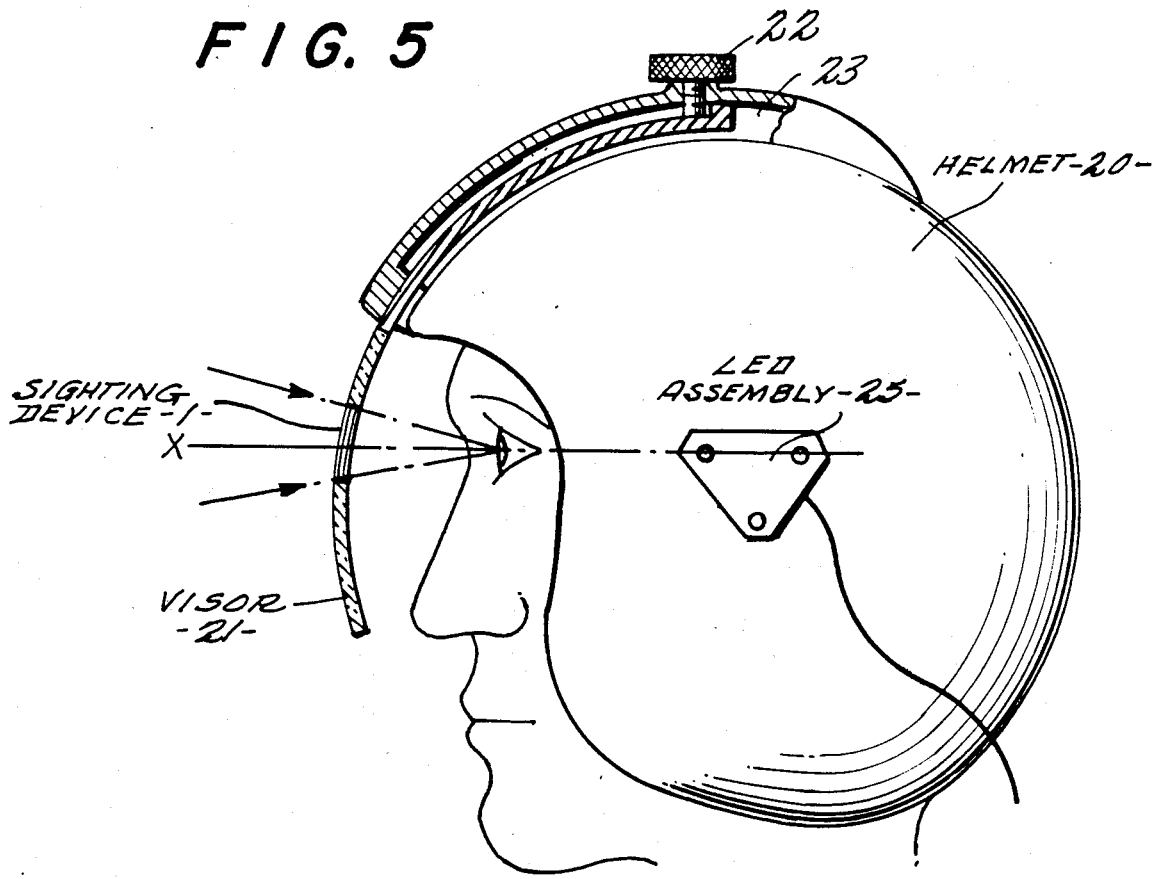
FIG. 5 illustrates another embodiment of a sighting device in accordance with the invention and entailing the use of a helmet visor.

FIG. 5 illustrates another example of construction on a helmet 20. The static optical sighting device 1 is integrated in the visor 21 which is made capable of displacement by slackening the screw 22 and sliding within a housing 23. Thus the sighting device 1 is locked on the line of sight of the eye during use and will be located outside the field of view when it is not in use. The sighting device 1 may be formed of flat plates as described earlier or of curved plates which conform to the curved contour of the visor. The direction-indicating means can be of the optical type, for example, with a group 25 of electroluminescent diodes mounted on the helmet and ancillary means (not shown) comprising means for successive and sequential supply of the diodes and detection means. The detector or sensor is stationarily fixed on the aircraft. There are many solutions of this type see in particular the French Pat. No. 2 399 033 or the U.S. Pat. No. 4,193,689. The diodes placed around the sighting device (such as the diodes 15 and 16 shown in FIG. 3) for directional information or the like have not been shown for the sake of enhanced simplicity of the figure.

It can be understood that the direction-indicating device can just as readily be employed in the helmet-mounted version and likewise that the optical design can also be mounted in the spectacle-mounted version. In the case of a stationary installation, direction-indicating can be performed simply by synchro devices or angular position detectors placed on the axes of rotation Y and Z and controlled either by hand or by a motor. There are thus many alternative forms of construction of the sighting device in accordance with the invention which accordingly forms a static, lightweight and compact apparatus. Moreover, the sighting device proper does not call for the use of any collimating optical system or for any energy other than the ambient incident light.

What is claimed is:

1. A sighting device comprising:
   means for simultaneous visual display of the landscape and of an image which is projected to infinity on an optical line of sight, said visual display means utilizing an assembly of crystal plates in which a birefringent plate having parallel faces is placed between two plates having the function of optical polarizing filters consisting respectively of a polarizer and an analyzer to produce said image in the form of interference fringes localized at infinity and which are generated from the incident light emitted by the landscape under observation, said optical line of sight corresponding to the crystal axis of the birefringent plate which is cut at right angles to this direction;
   means for indicating the direction of said line of sight with respect to a reference direction; and
   means for visual display of preliminary information relating to orientation of the sighting direction including a set of electroluminescent diodes placed outside the field of view of the interference fringes, and auxiliary computing means for automatically initiating turn-on and winking operation of the diodes at a frequency which is variable as a function of the relative angular displacement of the optical line of sight with respect to a given sighting direction, and auxiliary detection means for determining said given sighting direction and for transmitting the corresponding information to said computing means.

2. A sighting device comprising:
   means for simultaneous visual display of the landscape and of an image which is projected to infinity on an optical line of sight including an assembly of crystal plates in which a birefringent plate having parallel faces is placed between two plates having the function of optical polarizing filters consisting respectively of a polarizer and an analyzer to produce said image in the form of interference fringes localized at infinity and which are generated from the incident light emitted by the landscape under observation, said optical line of sight corresponding to the crystal axis of the birefringent plate which is cut at right angles to this direction;
   means for indicating the direction of said line of sight with respect to a reference direction, said direction-indicating means being of the magnetic type including a three coil assembly sensor, a three coil assembly radiator, processing means and auxiliary computing means; and
   means for visual display of preliminary information relating to orientation of the sighting direction including a set of electroluminescent diodes placed outside the field of view of the interference fringes, said auxiliary computing means automatically initiating turn-on and winking operation of the diodes at a frequency which is variable as a function of the relative angular displacement of the optical line of sight with respect to a given sighting direction, and auxiliary detection means for determining said given sighting direction and for transmitting the corresponding information to said computing means;
   said visual display means and said electroluminescent diodes being mounted in one eyeglass of a spectacle frame, said sensor being rigidly fixed to said spectacle frame.

3. A sighting device according to claim 2, wherein said electroluminescent diodes are placed at uniform intervals in a circle and are mounted on a said polarizer plate, said birefringent crystal plate as well as the polarizing plates being circular and having a diameter smaller than the polarizer plates in order to form a space for passing wires which serve to supply said diodes.

4. A sighting device comprising:
   means for simultaneous visual display of the landscape and of an image which is projected to infinity on an optical line of sight, said visual display means utilizing an assembly of crystal plates in which a birefringent plate having parallel faces is placed between two plates having the function of optical polarizing filters consisting respectively of a polarizer and an analyzer to produce said image in the form of interference fringes localized at infinity and which are generated from the incident light emitted by the landscape under observation, said optical line of sight corresponding to the crystal axis of the birefringent plate which is cut at right angles to this direction;

means for indicating the direction of said line of sight with respect to a reference direction, said direction-indicating means being of the magnetic type including a three coil assembly sensor, a three coil assembly radiator, processing means and auxiliary computing means; and means for visual display of preliminary information relating to orientation of the sighting direction including a set of electroluminescent diodes placed outside the field of view of the interference fringes, said auxiliary computing means automatically initiating turn-on and winking operation of the diodes at a frequency which is variable as a function of the relative angular displacement of the optical line of sight with respect to a given sighting direction, and auxiliary detection means for determining said given sighting direction and for transmitting the corresponding information to said computing means;

said visual display means and said electroluminescent diodes being mounted on an helmet, said sensor being rigidly fixed to said helmet.

5. A sighting device according to claim 4, wherein said electroluminescent diodes are placed at uniform intervals in a circle and are mounted on a said polarizer plate, said birefringent crystal plate as well as the polarizing plates being circular and having a diameter smaller than the polarizer plates in order to form a space for passing wires which serve to supply said diodes.

6. A sighting device comprising:

means for simultaneous visual display of the landscape and of an image which is projected to infinity on an optical line of sight including an assembly of crystal plates in which a birefringent plate having parallel faces is placed between two plates having the function of optical polarizing filters consisting respectively of a polarizer and an analyzer in order to produce said image in the form of interference fringes localized at infinity and which are generated from the incident light emitted by the landscape under observation, said optical line of sight corresponding to the crystal axis of the birefringent plate which is cut at right angles to this direction;

means for indicating the direction of said line of sight with respect to a reference direction, said direction-indicating means including a first group of electroluminescent diodes mounted on the supporting member of the visual display means; and means for visual display of preliminary information relating to orientation of the sighting direction including a second group of electroluminescent diodes placed outside the field of view of the interference fringes, said computing means automatically initiating turn-on and winking operation of the diodes at a frequency which is variable as a function of the relative angular displacement of the optical line of sight with respect to a given sighting direction, and auxiliary detection means for determining said given sighting direction;

said visual display means and said first and second groups of electroluminescent diodes being supported by an helmet.

7. A sighting device according to claim 6, wherein said second group electroluminescent diodes are placed at uniform intervals in a circle and are mounted on a said polarizer plate, said birefringent crystal plate as well as the polarizing plates being circular and having a diameter smaller than the polarizer plates in order to form a space for passing wires which serve to supply said second group of diodes.

* * * * *